– – –

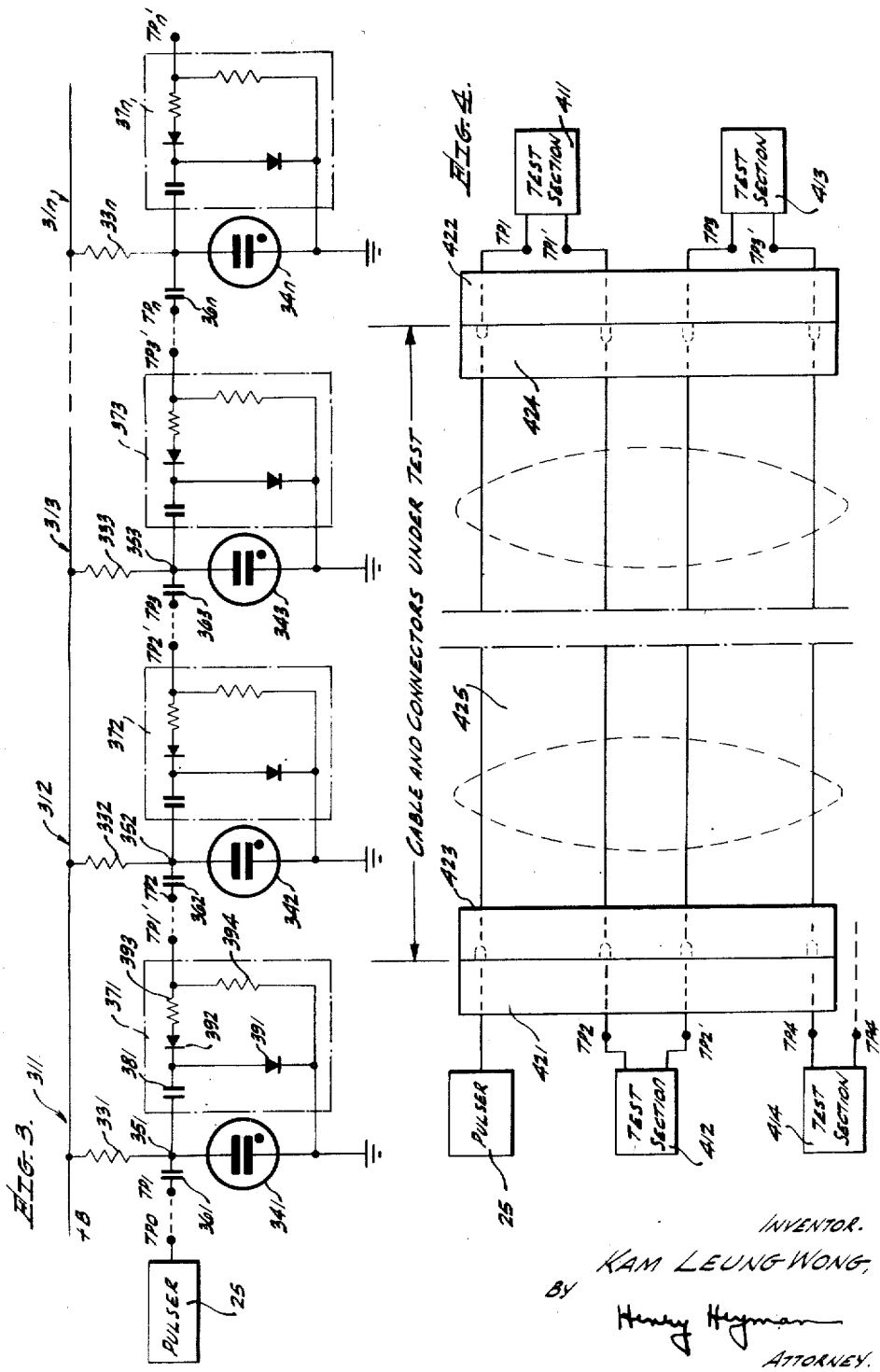

2,814,774

CONTINUITY AND SHORT TESTER

Kam Leung Wong, Culver City, Calif., assignor to Hughes Aircraft Company, Culver City, Calif., a corporation of Delaware Application December 2, 1955, Serial No. 550,573

6 Claims. (Cl. 324—51)

– – –

The present invention relates to testing devices and more particularly to an electrical continuity and short tester for indicating leakages and shorts between a plurality of electrodes of a device under test.

In continuity and short testing, it has long been customary to employ a simple series circuit comprising a power source and an indicator for testing a single pair of electrodes at a time. While the present invention reduces in its simplest form to a single pair test device, the invention in its most general form may be used to determine continuity and shorts between an unlimited number of points simultaneously. The prior art devices for simultaneously testing continuity between a plurality of points have generally required polyphase voltages for their successful operation. From a practical standpoint, this requirement has limited testing to six points, since the generation of voltages of greater phase complexity is relatively difficult. At the same time the generation of even six-phase voltages requires complex and costly equipment.

It is therefore an object of the present invention to provide an electrical continuity and short tester for testing and indicating leakages and shorts between a plurality of electrodes of a device under test.

A further object of the present invention is to provide a continuity and short tester for indicating shorts and leakages between an unlimited number of points in an electrical device, the test being performed with respect to all points simultaneously.

Another object of the present invention is to provide a continuity and short tester which is simple to operate, positive in indication, yet is fabricated from a minimum number of relatively inexpensive parts.

Yet another object of the present invention is to provide a multiple electrode continuity and short tester having a mode of indication which is particularly useful for confirming the proper wiring of cables and similar electrical circuits.

An electrical continuity and short tester according to the present invention comprises a plurality of series circuits each including a resistor and a gaseous discharge device, the series circuits being connected in parallel across a source of voltage potential; and means for connecting the common point of each resistor-gaseous device circuit to an electrode of the device to be tested. According to one embodiment of the present invention the means for interconnecting the common point and the electrode to be tested comprises a capacitor, while according to another embodiment of the invention, the means comprises a capacitor for connecting the common point to a first test electrode and a unilaterally conductive network for connecting the common point to another test electrode.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Fig. 3 is a circuit diagram of another embodiment of the present invention.

Fig. 4 is a circuit diagram illustrating the use of the embodiment of Fig. 3 for testing continuity in electrical cables, whereby the correctness of the wiring may be readily determined and displayed.

Figure 1:
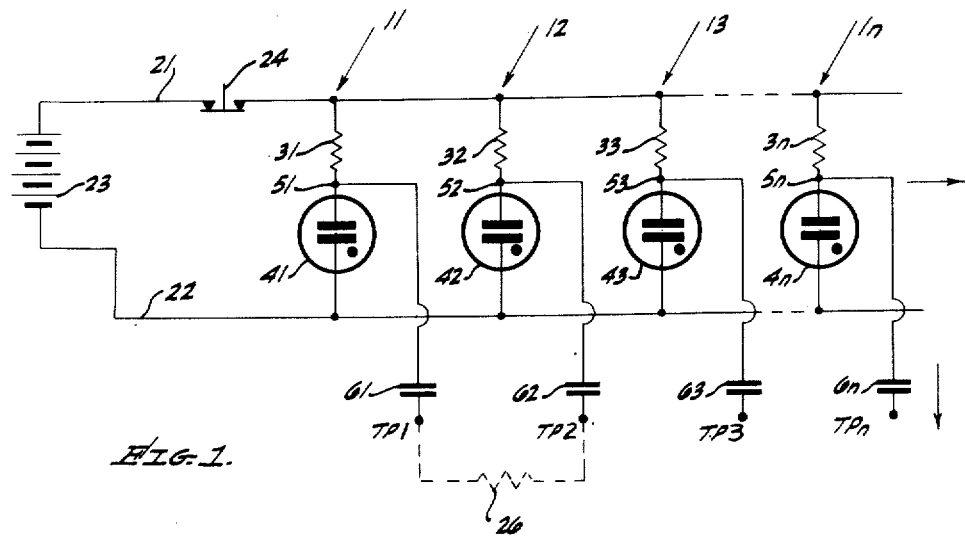
Fig. 1 is a circuit diagram of one embodiment of the present invention.

Referring now to the drawings wherein the same reference characters designate the similar elements in the several views, an electrical continuity and short tester, according to the present invention, comprises, as shown in Fig. 1, a plurality of test sections 11, 12, 13 . . . 1$n$, $n$ being any number and corresponding for example to the number of electrodes in the device to be tested. Each test section is connected across a pair of power supply leads 21, 22, to which is applied a potential from a source of voltage 23. Each of test sections 11, 12, 13 . . . 1$n$ is identical and comprises a resistor 31, 32, 33 . . . 3$n$, and a gaseous discharge device 41, 42, 43 . . . 4$n$ connected in series. Means are provided for interconnecting the common points 51, 52, 53 . . . 5$n$ of each serially connected resistor-gaseous discharge- device circuit to the respective points between which electrical continuity is to be tested, the means comprising as shown in Fig. 1, a plurality of capacitors 61, 62, 63 . . . 6$n$ for connecting the common points to a plurality of test points TP1, TP2, TP3 . . . TP$n$.

Preferably, the voltage supplied by voltage source 23 should be direct current and have a potential greater than the firing potential of gaseous discharge devices 41, 42, 43 . . . 4$n$. These gaseous discharge devices may be conventional two-element neon lamps, and will be so referred to hereinafter. Resistors 31, 32, 33 . . . 3$n$ should have a value sufficient to limit the conducting current of each associated neon lamp to desired values when the lamp is conducting, while capacitors 61, 62, 63 . . . 6$n$ should be large enough to provide that relaxation oscillations which take place in the presence of short circuits between test points occur at a visible frequency, as will be explained more fully hereinafter.

In operation, each of the test points may be connected to an electrode of the device to be tested and voltage applied from source 23 by actuating switch 24.

If each of the test points is open circuited with respect to all other test points, corresponding to a condition of infinite resistance between electrodes of the device under test, no oscillations will occur and each of the neon lamps will conduct continuously. When, on the other hand, a finite resistance is present between any two test points such as shown by dotted resistor 26 between test points TP1 and TP2, the neon lamps of the corresponding test sections will be alternately extinguished and fired, as will be explained hereinafter, thereby indicating that a short is present between the corresponding test points. If the leakage resistance is present across only two test points the corresponding neon lamps will oscillate bistably, alternately firing and extinguishing in oscillation, while if the short or leakage is present across three terminals, the three corresponding neon lamps will fire and extinguish in a sequence determined by the values of leakage resistance present.

Thus, for example, if a short circuit such as resistor 26 is present between test points TP1 and TP2, and it is assumed that neon lamp 41 has a firing potential slightly less than that of neon lamp 42, the initial application of positive potential from source 23 to the tester will cause lamp 41 to fire. The firing of lamp 41 will lower the potential of point 51 to the conducting potential of the lamp, and, since capacitors 61 and 62 are initially uncharged, point 52 will assume the same potential and lamp 42 will remain unfired. Since lamp 42 in its unfired state presents an effective open circuit across its terminals, capacitors 61 and 62 will begin to charge through resistor 32, resistor 26 indicating a short across the test points and lamp 41. As the capacitors charge the potential of point 52 will rise until the firing potential of lamp 42 is reached, whereupon lamp 42 will fire and lower the potential of point 52 instantaneously to the conducting potential of the lamp. At this instant, the charge on capacitors 61 and 62 will substantially correspond to the difference between the firing and conducting potentials of the lamps, and accordingly, the firing of lamp 42 will cause the potential of point 51 to fall a corresponding amount. This voltage drop will cause lamp 41 to extinguish, whereupon capacitors 61 and 62 will recharge in a reverse direction through resistor 31, the short circuit between the test points or resistor 26 and lamp 42. This charging will continue until lamp 41 fires in a manner similar to that described for lamp 42, whereupon lamp 42 will be extinguished. The bistable firing and extinguishing of lamps 41 and 42 will continue as long as power is supplied, thereby indicating that a short exists between test points TP1 and TP2.

While the operation has been described under the assumption that the resistance between the test points is negligible, a similar response will take place for finite values of resistance up to a value of resistance for which both lamps conduct continuously. Since the period of the oscillation is determined by the value of the shorting resistor 26, a rough indication of the order of magnitude of the resistance may be obtained by observing the period of the relaxation oscillations taking place. This period may conveniently be adjusted to a readily observable frequency by selecting capacitors 61 and 62 of appropriate value.

If the short or leakage presented to the test points bridges three or more terminals, the three or more corresponding neon lamps will fire and extinguish in a similar manner. Ordinarily, if the test sections are substantially identical only one of the test lamps will be extinguished at a time. The sequence of firing will be determined by the values of leakage resistance present and the sequence in which the test points have been bridged.

Where three or more lamps fire and extinguish during a test, indicating leakage between the corresponding three or more electrodes of the device being tested, it may be desirable to determine the manner in which the leakage resistances bridge the electrodes. Such a determination may be easily made by opening the circuit to each of the test sections in turn and observing the response of the tester.

The tester of the present invention may be utilized to give a rough indication of the values of the leakage resistances present by providing that resistances 31, 32, 33 . . . 31n be adjustable, or by providing that the voltage potential from source 23 be adjustable. These adjustable resistance or potential values may conveniently be calibrated by means of standard resistors to indicate the corresponding leakage resistance required to produce oscillation.

Figure 2:
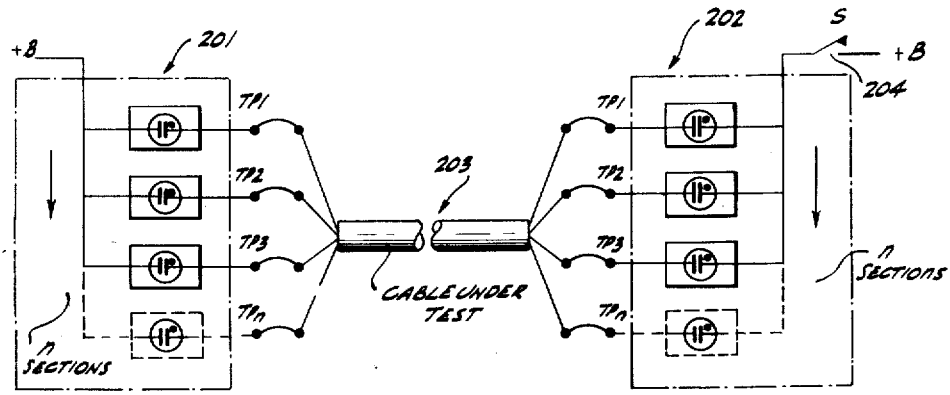
Fig. 2 is a circuit diagram illustrating the use of the embodiment of Fig. 1 to test both continuity and leakage in an electrical cable or similar electrical circuit.

The embodiment of the invention shown in Fig. 1 may be used to test both continuity and leakage in an electrical cable or similar electrical circuit, as shown in Fig. 2, wherein two testers 201 and 202, each corresponding to the embodiment of Fig. 1 are used to test continuity and leakage of a cable 203. As shown in Fig. 2, each of testers 201 and 202 is identical, and includes $n$ test sections, where $n$ is selected to correspond to the number of leads or similar elements in the device to be tested. The test points of tester 201 are each connected to the leads at one end of the cable while the test points of tester 202 are connected to the leads at the other end of the cable. Corresponding tester sections in the two testers need not be connected to the ends of the same leads. In addition to the circuit components shown in Fig. 1, tester 202 is provided with a switch 204 for interrupting the voltage supply to the tester.

In operation, leakage between the various leads in cable 203 may be tested by opening switch 204, whereupon tester 201 will indicate leakage between its various test points in a manner identical to that described for the tester of Fig. 1. Ordinarily, the leakage resistances presented across the remaining ends of the cable by tester 202 will correspond substantially to an open circuit. Continuity of the cable may then be tested by closing switch 204, whereupon testers 201 and 202 form a single tester corresponding to the embodiment of Fig. 1 but now having $2n$ test sections. Since the conductors of cable 203 now form short circuits between the various test points, all neon lamps of the tester will extinguish and fire in an oscillatory manner if the conductors of the cable are all continuous. On the other hand, if any of the conductors are open the two neon lamps corresponding to the test points connected to the ends of the particular conductor will remain on continuously and the defective conductor may be readily identified.

Where all of the conductors are continuous, the alternate firing of the neon lamps will ordinarily preclude identification of the ends of a particular conductor from the pattern formed by the lamps. In such a case, use may again be made of switches in each test section of tester 201, for example, to disable all but one of the test sections, in which case the remaining one not-disabled test section and the corresponding test section in tester 202 will fire and extinguish alternately, thereby identifying corresponding cable ends.

Where, for example, it is desired to check proper wiring of the plugs and sockets associated with a multi-conductor cable and secure a more positive indication of the correctness of the wiring, use may be made of the embodiment of the invention shown in Fig. 3. The embodiment of Fig. 3 is responsive to the application of a negative voltage pulse in the presence of appropriate interconnection of its various test points for sequentially extinguishing and refiring each of the neon lamps of the test sections, and includes, in addition to the elements of the embodiment of Fig. 1, a pulser 25 and a plurality of unidirectional coupling networks 371, 372, 373 . . . 37n for each of the $n$ stages of the tester. Each unidirectional coupling network interconnects the common point of the tester stage with an additional test point TP1', TP2', etc., and includes for example, as numbered in stage 311, a capacitor 381 interconnecting common point 351 and a pair of diodes 391 and 392. Diode 391 has its remaining lead connected to ground while the remaining lead of diode 392 is connected to a resistor 393. The other end of resistor 393 is connected to test point TP1' and to ground through another resistor 394. Diodes 391 and 392 should be poled to provide that negative going pulses such as occur when neon lamp 341 fires are coupled to and appear on test point TP1' while negative going pulses which occur when neon lamp 342 extinguishes are dissipated across resistor 393 and do not re-extinguish lamp 341 when TP1' and TP2 are interconnected by a continuous conductor as explained more fully hereinafter. Where the voltage supplied by source +B is of the polarity shown, diodes 391 and 392 should be poled as shown to perform this function.

Considering now the operation of the tester thus described when testing a multi-conductor cable for continuity, pulser 25 may be connected to one end of a particular conductor of the cable, the other end of the conductor being connected to test point TP1. The test point TP1' is in turn connected to one end of a second conductor of the cable and the remaining end of the second conductor connected to test point TP2. The remaining test sections of the tester are interconnected with the remaining leads of the cable in a similar manner. The application of potential to the tester will now cause all of the neon lamps to fire and conduct.

If a negative pulse of sufficient amplitude is now applied to the first conductor by pulser 25, and the conductor is continuous, the pulse will travel through the conductor and extinguish neon lamp 341.

Lamp 341 will remain extinguished until capacitor 381 has recharged through resistor 331 and diode 391, and point 351 has risen to the firing potential of the lamp, whereupon the lamp 341 will fire again. The firing of lamp 341 will now cause capacitor 381 to discharge through the series circuit comprising neon lamp 341, resistor 394, resistor 393 and diode 392, and this flow of current will cause a negative pulse to appear at test point TP1'. If the conductor of the cable interconnecting test point TP1' and test point TP2 is continuous, this negative pulse will be coupled through capacitor 362 to extinguish neon lamp 342 in the second test section, and unidirectional coupling network 372 will refire the lamp in a manner similar to network 371 with respect to lamp 341. The refiring of lamp 342 will similarly produce a negative pulse at both test points TP2 and TP2', but no portion of this pulse will return through capacitor 362 to extinguish lamp 341 since diode 392 presents an open circuit to these pulses. If the remaining conductors of the cable are continuous, each of the neon lamps of the remaining test sections will extinguish and refire in turn, in a similar manner.

On the other hand, if any of the conductors are discontinuous, the extinguishing of the lamps will cease at the test section immediately preceeding the open-circuited conductor, and the lamps of the remaining test sections will remain on continuously. The first open-circuited conductor may thus be readily identified.

The embodiment of the invention shown in Fig. 3 may be readily adapted to indicate proper wiring of the plugs and sockets associated with a multi-conductor cable, as well as indicating open circuits in the conductors, using the embodiment shown in Fig. 4. The number of test sections required again corresponds to the number of conductors in the cable under test, but the test points of the test sections are now connected to a pair of receptacles 421, 422 designed to receive and establish connection with the plugs 423, 424 at each end of a cable 425 under test. If a properly wired cable is now tested, the lamps will be seen to extinguish and refire in turn, as described for the embodiment of Fig. 3. The lamps may conveniently be arranged in a sequence corresponding to the firing order for a properly wired cable, and the order of display may easily be followed through any number of stages. If a cable under test is improperly wired with respect to the previous arrangement of plugs and sockets for the tester, so that, for example, previously corresponding contact points in plugs 423, 424 are no longer connected together by one of the leads in cable 425, the neon lamps will extinguish in an order different from the sequence previously established. Such a faulty display may be readily recognized due to the failure of the lamps to extinguish in sequence, and the fault readily located by determining the point at which the sequence fails to follow its proper order. The speed of the display may be conveniently pre-set to desired intervals by appropriate selection of the values of the various resistors and capacitors in the circuit.

What is claimed as new is:

1. An electrical continuity and short tester for selectively testing and indicating shorts between a plurality of conductors of a multiple conductor cable or for testing and indicating the continuity of the conductors, said tester comprising: a first plurality of normally conducting gaseout discharge devices including one device for each conductor of the cable to be tested; a source of potential for supplying voltage to each device; a first plurality of resistors connected in series with each of said devices for limiting the current therethrough when said devices are conducting; means interconnecting one of the ends of each of the conductors of the cable to be tested and the common point of said series resistor and device; a second plurality of gaseous discharge devices including one device for each conductor of the cable to be tested; a second plurality of resistors connected in series with each device of said second plurality of gaseous discharge devices; means interconnecting the other of the ends of each of the conductors of the cable to be tested and the common point of each of said second plurality of series resistors and devices, and means for selectively applying voltage across said second plurality of serially connected devices and resistors, whereby said first plurality of devices indicates the presence of a short among the conductors of a cable under test in the absence of potential across said second plurality of devices and resistors and said first and second plurality of devices indicates continuity of each conductor of said cable in the presence of voltage across said first and second plurality of devices and resistors.

2. A continuity and short tester for indicating leakages and shorts between a plurality of electrodes of a device comprising: a source of voltage; a plurality of test sections including one test section for each electrode of the device to be tested, each of said test sections being connected in parallel across said source of voltage potential and including a normally conducting gaseous discharge device and a resistor connected in series with said gaseous discharge device for limiting the current therethrough when said gaseous discharge device is conducting; and a plurality of capacitors including one for each test section for interconnecting the common point of each of said serially connected resistor and discharge devices to an electrode of the device under test.

3. A tester for testing and indicating the continuity of each of the conductors of a multiple conductor cable, said tester comprising: a source of voltage; a plurality of test sections including one test section for each conductor of the cable to be tested, said test sections being connected in parallel across said source of potential and each including a gaseous discharge device and a first resistor connected in series; a first capacitor for interconnecting the common point of said resistor and discharge device combination to one of the ends of a conductor of the cable to be tested; and a unidirectional coupling network for connecting said common point to a corresponding end of another conductor of the cable to be tested.

4. The tester defined in claim 3 wherein said unidirectional coupling network comprises a second capacitor and a first diode connected in series across said gaseous discharge device, and a second diode and second and third resistors connected in series across said first diode, and means for interconnecting the corresponding end of said another conductor to a point intermediate said first and second resistors.

5. In a tester for sequentially testing and indicating the continuity of each of the conductors of a multiple conductor cable, a source of voltage; a source of voltage pulses; a test section including a gaseous discharge device and resistor connected in series across said voltage source; a capacitor for interconnecting the common point of said resistor and gaseous device in combination to an end of one conductor of the cable to be tested and a unidirectional coupling network for connecting said common point to a corresponding end of another conductor of the cable to be tested; and means for connecting said pulse source to the other end of said one conductor, said tester being responsive to pulses from said pulse source when said conductor is continuous for extinguishing and refiring the gaseous discharge device of said test section.

6. An electrical continuity and short tester for indicating leakages and shorts between a plurality of electrodes of a device under test comprising: a plurality of test sections including one test section for each electrode of the device to be tested, said test sections each including a gaseous discharge device and a resistor connected in series; a source of voltage, said source having a potential greater than the firing potential of each of said discharge devices; means for connecting said test sections in parallel across said source; a plurality of capacitors including one capacitor for each of said test sections, each of said capacitors having one side connected to the common point of said serially connected resistor and gaseous discharge device and the remaining side adapted for connection to an electrode of the device to be tested, the value of each of said resistors being adjusted to permit said voltage source to excite each of said discharge devices in the absence of a conductive path between the electrodes of the device under test, and the value of said capacitor being selected to provide for alternate extinguishing and firing of and between the corresponding discharge devices when a conductive path exists among the electrodes of the device under test.

References Cited in the file of this patent
UNITED STATES PATENTS

| | | |
|---|---|---|
| 2,137,859 | Schwartz et al. | Nov. 22, 1938 |
| 2,478,414 | Michal | Aug. 9, 1949 |
| 2,582,499 | Messerschmidt | Jan. 15, 1952 |
| 2,760,151 | Andrews et al. | Aug. 21, 1956 |

UNITED STATES PATENT OFFICE

CERTIFICATE OF CORRECTION

Patent No. 2,814,774                              November 26, 1957

Kam Leung Wong

It is hereby certified that error appears in the printed specification of the above numbered patent requiring correction and that the said Letters Patent should read as corrected below.

Column 6, line 69, before "combination" strike out "in".

Signed and sealed this 21st day of January 1958.

(SEAL)
Attest:
KARL H. AXLINE
Attesting Officer

ROBERT C. WATSON
Commissioner of Patents